United States Patent [19]

Hershey et al.

[11] Patent Number: 5,568,471
[45] Date of Patent: Oct. 22, 1996

[54] SYSTEM AND METHOD FOR A WORKSTATION MONITORING AND CONTROL OF MULTIPLE NETWORKS HAVING DIFFERENT PROTOCOLS

[75] Inventors: Paul C. Hershey, Manassas, Va.; John G. Waclawsky, Frederick, Md.

[73] Assignee: International Business Machines Corporation, Armonk, N.Y.

[21] Appl. No.: 524,029

[22] Filed: Sep. 6, 1995

[51] Int. Cl.$^6$ .............................. H04J 3/14; H04L 12/26; H04L 12/46
[52] U.S. Cl. .................... 370/17; 370/85.13; 370/94.1
[58] Field of Search .................................. 370/13, 17, 16, 370/79, 85.1, 85.9, 85.11, 85.13, 85.14, 92, 94.1, 94.2, 94.3, 60, 60.1; 371/5.1, 8.1, 8.2, 48; 395/200.07, 200.11, 200.2

[56] References Cited

U.S. PATENT DOCUMENTS

| | | | |
|---|---|---|---|
| 4,817,080 | 3/1989 | Soha | 370/17 |
| 5,023,873 | 6/1991 | Stevenson et al. | 371/8.2 |
| 5,079,765 | 1/1992 | Nakamura | 370/85.13 |
| 5,097,469 | 3/1992 | Douglas | 371/20.1 |
| 5,132,962 | 7/1992 | Hobgood et al. | 370/16.1 |
| 5,293,488 | 3/1994 | Riley et al. | 395/200 |
| 5,315,580 | 5/1994 | Phaal | 370/13 |
| 5,329,521 | 7/1994 | Walsh | 370/16 |
| 5,434,863 | 7/1995 | Onishi et al. | 370/85.13 |
| 5,490,252 | 2/1996 | Macera et al. | 370/85.13 |

OTHER PUBLICATIONS

IBM Technical Disclosure Bulletin, vol. 34, No. 7B, Dec. 1991, pp. 164–166, "Fault Tolerant Host Channel Adapter".
IBM Technical Disclosure Bulletin, vol. 33, No. 1A, Jun. 1990, pp. 23–28, "High Availability Power Bus System".
IBM Technical Disclosure Bulletin, vol. 32, No. 11, Apr. 1990, p. 262, "Method of Measuring the Latency of a Token–Ring with Microcode.".

Primary Examiner—Hassan Kizou
Attorney, Agent, or Firm—John D. Flynn; John E. Hoel

[57] ABSTRACT

A workstation manages and controls a plurality of communication networks using different protocols coupled to a common bus. A programmable digital filter connected between the workstation and the networks examines frame information using real time calculation for identifying protocols in the frames. The filter identifies and counts addresses, security conditions and other information of interest on the bus and occurring in the networks. The protocol, address, security data and other information of interest counted by the filter are stored in storage for access by an interpreter. The stored data for the networks accessed by the interpreter is compared to network models for identification of traffic problems and conditions and load balancing. The network interpreter contains a graphical user interface which displays selected information at a monitor for an operator to examine and initiate corrective action by initiating commands. A microprocessor executes the commands for overcoming the traffic condition or problem occurring on the different networks. The microprocessor is further adapted to initiate load balancing in the networks according to the commands issued by the interpreter.

10 Claims, 5 Drawing Sheets

DATA FRAME FORMAT

FIG. 5

1. INCREASE OR DECREASE DATA TRANSFER RATE TO SPECIFIC ADAPTERS - USE DIRECT MEMORY ACCESS

2. FAULT MANAGEMENT - SWITCH IN HOT STANDBY (E.G. SWITCH IN T3 2 WHEN T3 1 FAILS)

3. SECURITY - TAKE OUT ADAPTERS WHEN INTRUSION DETECTION IS DISCOVERED BY ICA

4. ROUTER TOPOLOGY - CLEAR VIEW OF MULTIPROTOCOL NETWORK
   - MONITORING FACILITY
   - IDENTIFY FAULTY LINKS AND FIND ALTERNATIVE PATHS.

5. WORKSTATION INTRAPROCESSING - OPTIMIZE TASK BREAKDOWN BETWEEN MULTIPLE PROCESSORS WITHIN A SINGLE WORKSTATION

SYSTEM AND METHOD FOR A WORKSTATION MONITORING AND CONTROL OF MULTIPLE NETWORKS HAVING DIFFERENT PROTOCOLS

BACKGROUND OF THE INVENTION

1. Field of the Invention

This invention relates to data communication networks. More particularly, the invention relates to systems and methods for work station control of multiple networks using different protocols.

2. Description of Prior Art

Monitoring and controlling data networks is a necessary function for efficient operation of such networks. Without information indicating the status of the network with respect to faults, data rates, block sizes, intrusion, data switching, etc., successful operation of such networks may not be achieved. Monitoring and controlling of multiple data networks magnifies the problem. Moreover, the ability to manage and control multiple networks using different protocols from a single workstation raises the problem to another level.

In the related art, U.S. Pat. No. 5,023,873 issued Jun. 11, 1991 describes a communication link manager for problem determination and recovery of failing resources on a communication link. When a problem occurs on a link segment, the using node passes link event data to the communication link manager for analysis. The manager interacts with a configuration database to determine the physical configuration of the failing link and the controlling link connection subsystem manager. The link manager directs the appropriate link connection submanager to initiate tests of the various link connection components on the link segment under its control. When the failing resources is identified, the communication link manager initiates the appropriate non-disruptive recovery procedure through the link connection subsystem manager and prompts the data link to restart the line.

U.S. Pat. No. 5,132,962 discloses a serial communication network and more particularly a fault isolation and by-pass reconfiguration unit for use in a dual token ring serial communications network. The unit employs three adapters which in the presence of an internal fault establish an isolated token ring. The token ring includes one of the adapters and an associated port, to test and by-pass the default, while operating the reconfigured ring with the other two adapters.

U.S. Pat. No. 5,097,469 discloses a passive malfunction and performance monitor for a broadcast communications network. A network monitor passively detects sequence of control frame transmissions. The detected control frame sequences are compared, in real time, to a model of the expected change of control frames. The monitor concludes a malfunction has occurred when the detector control frame sequences do not match the frame sequences indicated by the model. The observed malfunctions are then recorded for corrective action.

U.S. Pat. No. 5,329,521 issued Jul. 12, 1994 discloses redundant local area network systems which enable network nodes otherwise unable to operate in redundant systems to operate in such systems. A plurality of communication nodes are operable to transmit and receive information across a plurality of communications links. Redundant adapters are coupled between the communications links and communication nodes, such that communication nodes are capable of transmitting and receiving information across each of the communication links.

In IBM Disclosure Bulletin, December 1991, pages 164–166, a fault tolerant host channel adapter is coupled between a fault tolerant computer system and a host system by emulating a control unit. The emulation is achieved through loadable microcode which may be altered to emulate a specific control type executing on the fault tolerant hardware. Different control unit emulations are achieved by loading separate emulation code modules. Errors in the operation of a particular emulation may be corrected by simply changing the emulation code.

None of the prior art discloses or suggests monitoring and/or controlling multiple data networks using different protocols from a single workstation. Nor does the prior art disclose or suggest altering the operation of such monitored and controlled networks based upon information collected and interpreted by the workstation.

Accordingly, a need exist in the art to monitor and control multiple data networks using different protocols from a single workstation adapted to alter the operation of such networks based upon information collected and interpreted by the workstation thereby enhancing the performance and utilization of data communication systems.

SUMMARY OF THE INVENTION

An object of the invention is a system and method using a workstation that is either external to or embedded within a router, hub, or switch for monitoring and controlling through a common bus multiple networks having different protocols.

Another object is a system and method using a single workstation and a passive, real time monitor for controlling through a common bus multiple data networks using different protocols.

Another object is a system and method using a workstation including an interpreter and a passive, real time monitor coupled via a common bus for monitoring and controlling multiple data networks having different protocols.

Another object is a system and method using a workstation and a passive, real time monitor coupled to a common bus for detecting faults in multiple networks using different protocols.

Another object is a system and method using a workstation including an interpreter and a real time, passive monitor to control concurrently multiple data networks using different protocols for fault detection diagnosis and network recovery purposes.

Another object is a workstation including an interpreter and a real time, passive monitor coupled through a common bus to multiple data networks using different protocols for the allocation of bus capacity through altering the networks.

Another object is a workstation, interpreter and a passive, real time monitor for identifying network protocols in packet data frames on multiple networks using different protocols for correcting operations on networks experiencing traffic problems.

These and other objects features and advantages are achieved in a system and method including a workstation having storage means and an interpreter coupled to a bus including an address line, data and control lines. Multiple data communication networks such as token ring, ethernet, FDDI, ATM, etc. having different protocols are coupled to the common bus for monitoring and control purposes by the workstation. A real time passive monitor detects traffic patterns in packet data frames. The patterns are indicative of events, such as faults, data activity, intrusion, etc. on the respective networks. The passive monitor is adapted to identify a network from an address transmitted to the workstation. The passive monitor is also adapted to identify network protocols using real time calculation of variable offset fields in the data frame. Based upon counts of different traffic patterns by the passive monitor, faults can be counted on the data, address and control buses. Also, the data activity can be calculated on the multiple networks by the passive monitor based upon the protocol associated with such network. The interpreter included in the workstation can initiate corrective action on such networks through a microprocessor which initiates commands to the different networks as required for load balancing, fault correction and substitution of stand-by adapters.

BRIEF DESCRIPTION OF THE DRAWINGS

The invention will be more fully apprehended from the following detailed specification taken in conjunction with the following drawings, in which:

FIG. 5 is a representation of the functions performed by a microprocessor responding to instructions provided by the interpreter for controlling the multiple networks in FIG. 1.

DESCRIPTION OF THE PREFERRED EMBODIMENT

Figure 1:
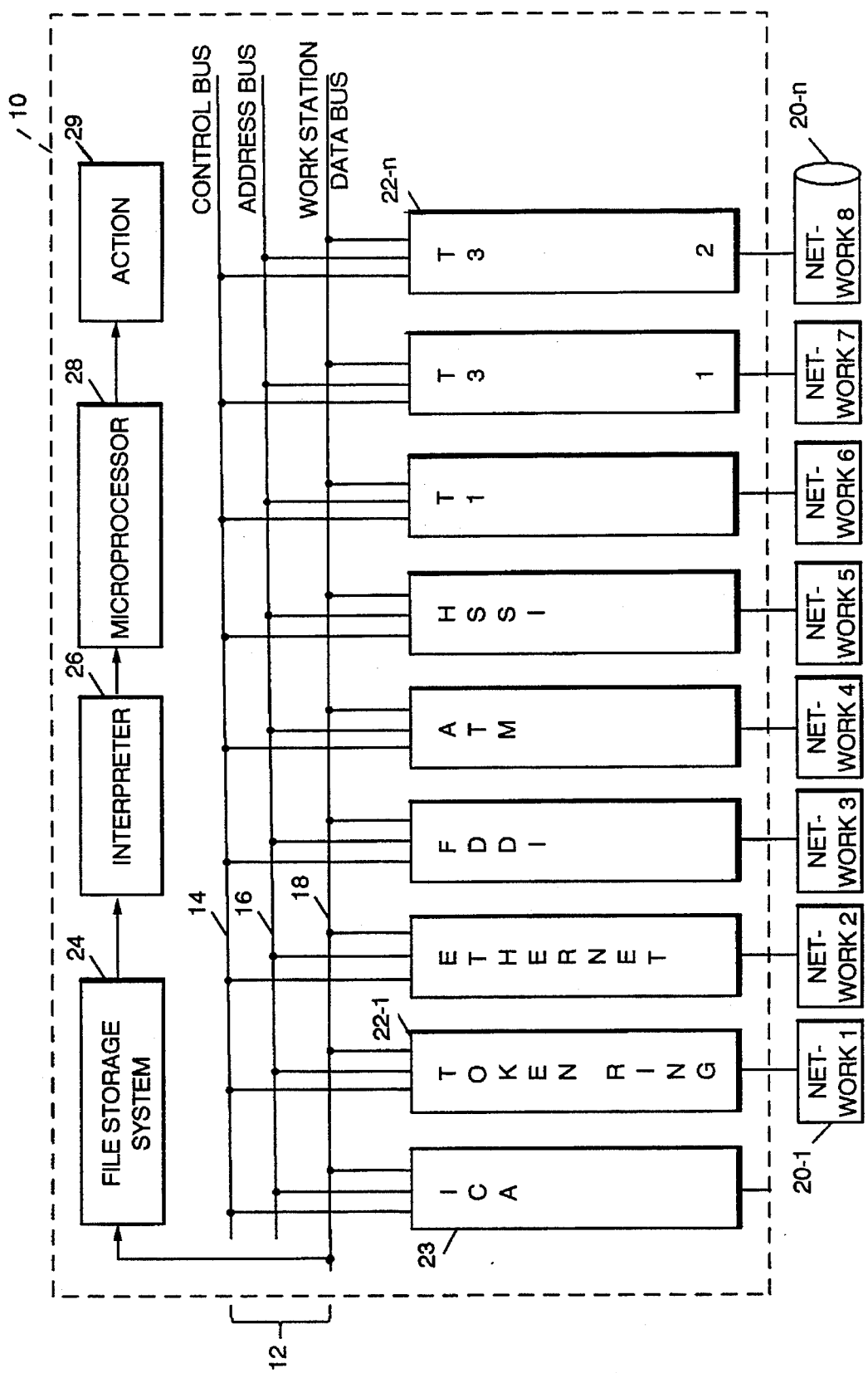
FIG. 1 is a block diagram of a workstation coupled to multiple networks through a common bus implementing the principles of the present invention.

In FIG. 1, a workstation 10 such as an IBM RS 6000 which performs routing, switching, or HUB functions includes a common bus 12 having control lines 14, address lines 16 and data lines 18. The common bus is coupled to multiple communication networks 20-1 . . . . 20-(n) by way of respective communication adapters 22-1 . . . 22-(n). A passive, real time monitor 23, such as a programmable digital filter is also coupled to the bus for monitoring of traffic patterns on the respective communication networks. One programmable digital filter which has application to the present invention is an event driven interface described in U.S. Pat. No. 5,365,514 issued Nov. 15, 1994 and U.S. Pat. No. 5,375,070 issued Dec. 20, 1994, both assigned to the assignee of the present invention, and incorporated herein in their entirety. The filter or event driven interface is adapted to monitor simultaneously dynamically changing events such as fault and protocol information on the data line 18 (error codes, wrong frame or cell length, etc.); fault and frequency of adapter access on the address line 16, and fault/security information on the control line 14.

Also included in the workstation is a file storage system 24 including a database which is accessed by an interpreter 26 for analyzing the collected data versus network models. Based upon the analysis performed by the interpreter commands of Actions 29 are generated for changing the networks according to the traffic condition existing on the network. The commands generated by the interpreter are implemented by a processor 28 in initiating corrective action on a network experiencing a traffic problem or condition.

The filter 23 is programmable, as described in U.S. Pat. No. 5,365,514, supra, to locate within each frame 30, shown in FIG. 2, embedded information indicative of protocol used in a network. The protocol can be correlated with data from the network. The network data can be organized and stored in the file storage system 24 for use by the interpreter 26 and microprocessor 28.

Figure 2:
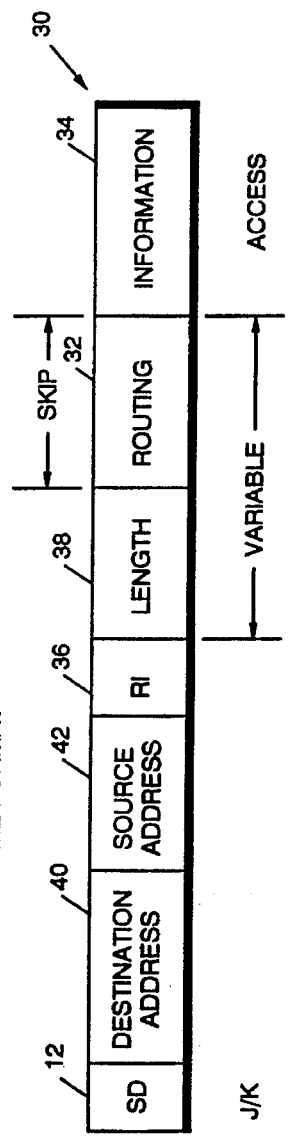
FIG. 2 is a representation of a data frame format transmitted on the networks of FIG. 1.

As one illustration the data frame, shown in FIG. 2, may be a standard frame used on an IBM token ring network. The frame contains a header 12 which among other things, includes a specification for the location of an information field 34 desired to be analyzed by the filter 23 for the protocol information. One problem with the frame is that the position of the information 34 is not fixed with respect to the header 12. The location for the field 34 is specified in a routing indicator field 36 for a token ring implementation. The filter 23 receives a serial bit stream on the bus 18 and when the frame 30 is identified by a characteristic for example, the header 12, the filter will detect a pattern of bits up to the point where the routing indicator 36 is located. The routing indicator bit determines whether the frame 30 is a communication within a network or whether the communication is from a network-to-network over a bridge or gateway. If the routing bit is for a frame within the network, the size of a routing field 32 is fixed whereby the length field 38 can be ignored so that the desired information 34 can be subjected to pattern recognition by the filter 23.

However, if the communication bit indicates a frame is intended to go to another network, the size of the field 32 is variable. Since the field 32 is variable, the filter will store the length field 38 in a register (not shown). The register is the address register for the filter which initiates a loop ignoring the number of bits in the variable size routing field 32. After the number of bits has passed into the filter 23, the information field 34 can be subject to pattern analysis in spite of the variable size routing field 32 which separates the information field 34 from the header 12. The details of real time calculation of the location of variablably offset fields in a data frame for identifying protocol information, are described in Ser. No. 08/188,167, filed Jan. 26, 1994, abandoned in favor of continuation application Ser. No. 08/551,283, assigned to the same assignee of the present invention and incorporated herein in its entirety by reference. With this feature, offset based embedded information can be located within each frame by the filter 23 and the interpreter 26 can identify both the protocol used to encapsulate the frame and any protocols embedded in the frame. Since destination 40 and source 42 addresses are contained in the frame 30, the various traffic patterns on the networks can be identified and counted by the filter 23 for storage in the storage file 24 for each network.

Figure 3:
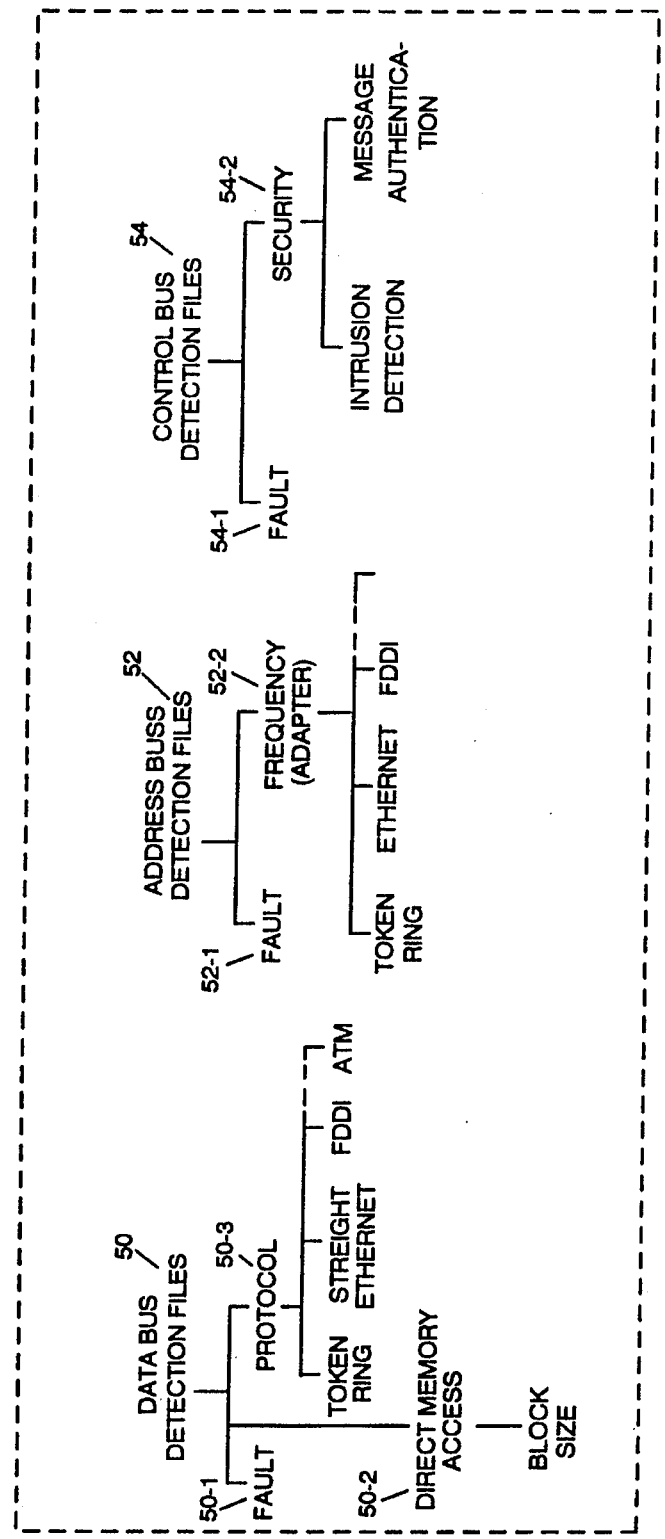
FIG. 3 is a representation of a file repository included in the workstation of FIG. 1.

In FIG. 3, the counts accumulated by the filter 23 for the different networks on the data 18, address 16 and control 14 lines can be stored in the storage means 24. A data line file 50 can be organized in the storage means 24 into several sub-files, a sub-file 50-1 containing the number of faults occurring on the data line 18 and counted by the filter 23; a sub-file 50-2 indicating the number of direct memory accesses occurring on the data line together with block sizes, and a protocol sub-file 50-3 indicating the number of frames transmitted on the different networks.

An address file 52 can be organized in the storage means 24, the file containing a fault sub-file 52-1 indicating the total number of faults on the address lines; an adapter frequency sub-file 52-2 indicating the number of frames transmitted or received on the different networks through the respective adapters.

Finally, a control line file 54 can be organized in the storage means 24 to indicate in a sub-file 54-1 the number of faults on the control line 14 and the number of security infractions in a security file 54-2. The sub-file 54-2 may be broken down into the number of intrusion detections and message authentication events occurring on the control line 14.

Figure 4:
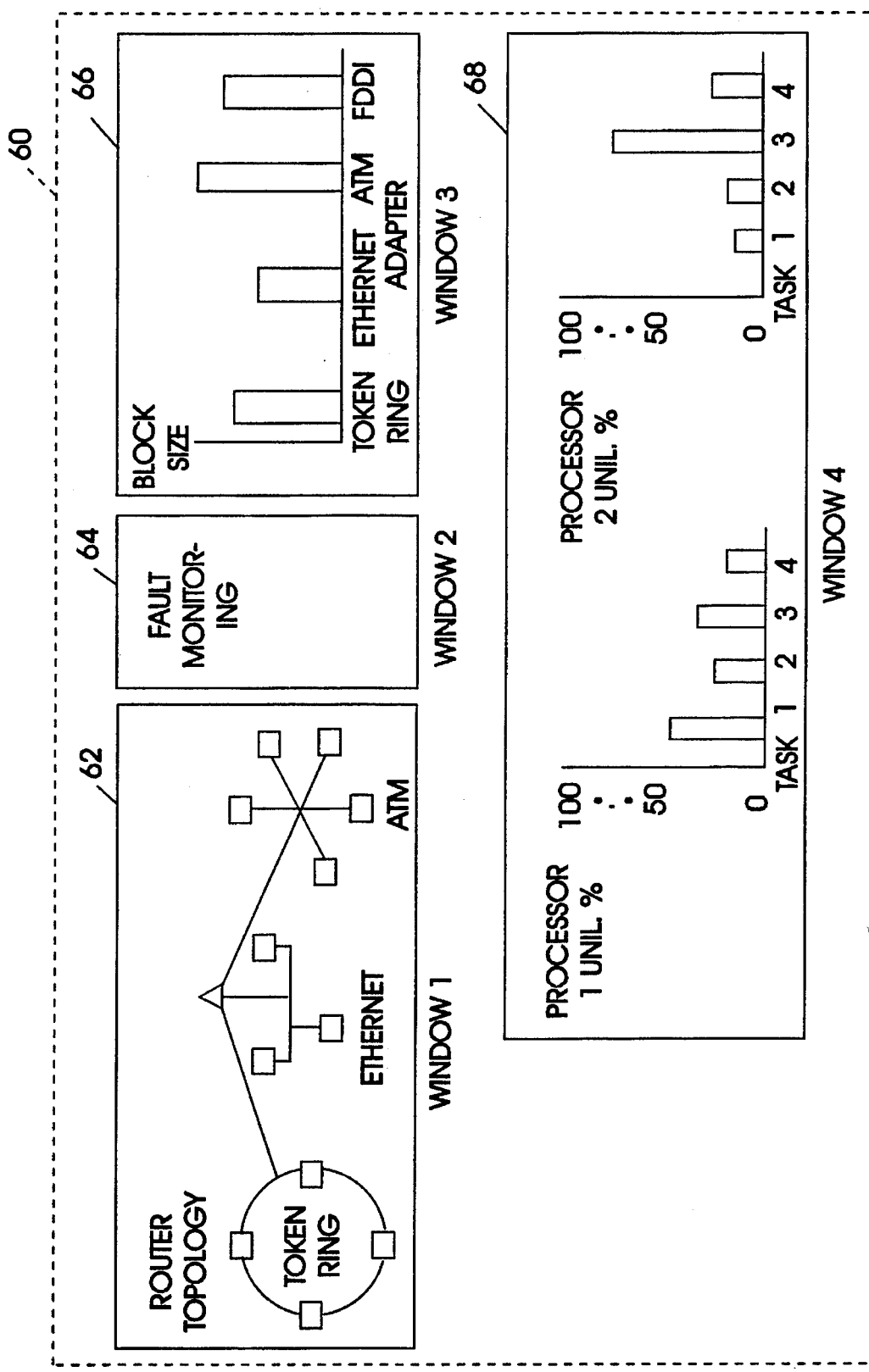
FIG. 4 is a conceptual graphic user interface (GUI) for an interpreter included in the workstation of FIG. 1.

In FIG. 4, a graphical user interface 60 contains a series of windows 62 indicating router topology for the workstation 10; a fault monitoring window 64 indicating fault conditions on the network with a switch 65 to switch in a substitute adapter for a defective adapter; and an adapter performance window 66 indicating the block sizes of data transmitted over the different networks. The interpreter also contains a window 68 showing multiple workstation processors utilization on a task-by-task basis occurring in the workstation 10. An operator viewing the interface 60 can take action to generate commands correcting traffic condition or problem occurring in the respective networks. The information and displays generated in each window are obtained by accessing the storage means 24 using standard stored program instructions contained in the interpreter. One example of an interpreter applicable to the present invention is described in Ser. No. 08/204,542, filed 1 Mar. 1993 entitled "System and Method For Configuring An Event Driven Interface and Analyzing Its Output For Monitoring and Controlling A Data Communication Network" U.S. Pat. No. 5,493,689.

The commands initiated by the interpreter 26 are supplied to the microprocessor 28 for corrective action in the respective networks as traffic problems or conditions arise. In FIG. 5, a partial list of corrective actions is given, it being understood, that other commands may be generated for other error or fault conditions occurring in the network.

A first command would be to increase or decrease data transfer rates to or from specific adapters using direct memory access (DMA). DMA is a technique in which the adaptor bypasses a computer's central processing unit and directly handles the transfer of data between the adapter and the system memory. This is accomplished by the programmable digital filter or real time passive monitor capturing internal processor information generated through DMA activity to or from an adapter card. Based on the activity information supplied to the interpreter, the flow of traffic to certain adapters can be increased or decreased to optimize traffic flow for internal workstation bus transfers.

A second command relating to fault management would switch in a hot stand-by adapter for an adapter that has failed. This is accomplished by the programmable digital filter monitoring the address, data and control lines for error control information available on an active network adapter. Upon detection by the filter of a failure, the interpreter would automatically switch over to the hot stand-by adapter.

A third command would remove an adapter from the network when an intrusion detection has been discovered by the filter 23. This would be accomplished by the interpreter maintaining a table of permissible network addresses. If the filter detects an address that is not in the table an intrusion would be recognized for corrective action.

A fourth command would initiate a display of router topology showing the monitoring facility, faulty links, and an indication of alternate paths. One method to accomplish this would be to develop a simple network management protocol (SNMP)—like management information base (MIB) with the assistance of the programmable digital filter. A MIB provides a set of parameters that a network management station can query. This information would be organized into a topological map of the network. The map would be displayed using a graphical users interface (GUI).

A fifth command would relate to optimizing task breakdown between multi-processors within a single workstation. This would be accomplished by the filter checking the cycle times and I/O of the processors in a multiprocessor workstation. The cycle times and I/O information would be supplied to the interpreter which would use mathematical algorithms to determine whether or not a processor was over or under utilized and then would optimize the workload served by the processors.

Figure 6:
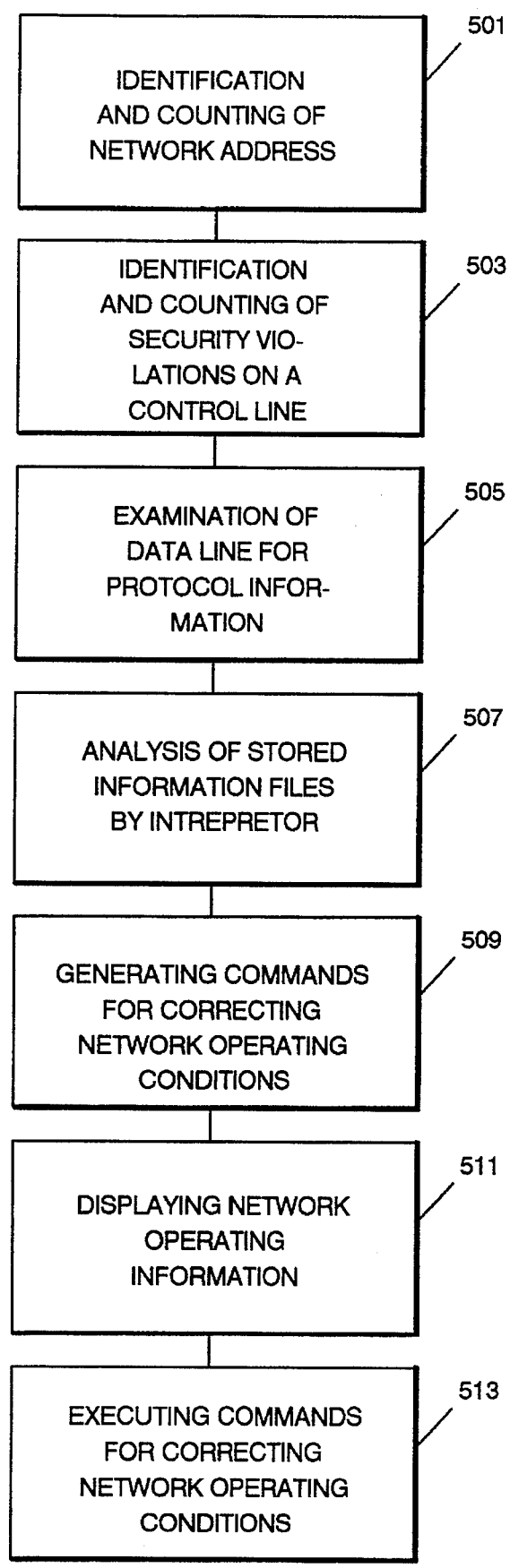
FIG. 6 is a flow diagram of a process monitoring and controlling the multiple networks of FIG. 1.

In FIG. 6, a flow diagram describes the processes implemented in the workstation and filter for monitoring and controlling the networks of FIG. 1.

In a step 501 the filter 23 identifies and counts the network address on the address bus for each network and stores the network address together with the frequency of use of the network in the storage means 24 along with fault data occurring on the address bus. The data is storied in the storage means in the form shown in file 52 of FIG. 3.

In a step 503, the filter 23 identifies and counts faults and security violations or other information of interest occurring on the control line 14 and stores the data in the control detection file 54 of the storage means 24 shown in FIG. 3.

In a step 505, the digital filter examines each frame on the data line 18 for protocol or other information of interest using processes described above and in Ser. No. 08/188,167, filed Jan. 26, 1994, abandoned in favor of continuation application Ser. No. 08/551,283, which together with the number of faults and direct memory accesses or other information of interest occurring on the bus 18 are stored in the data line detection file 50 in the storage mean 24 shown in FIG. 3.

In a step 507, the interpreter 26 accesses the storage means 24 to examine the information stored in the files 50, 52, and 54 relative to models for each network.

In an operation 509, the interpreter generates commands indicating corrective conditions on the respective networks based on a comparison between the stored data and the network models.

In an operation 511, the interpreter processes the stored data to generate data for display in the graphical users interface shown in FIG. 4. The windows of the display indicate relative to various parameters and conditions occurring in the networks.

In an operation 513, interpreter commands are sent to the processor 28 for operating and controlling switching circuitry in the various networks to overcome the traffic problem or condition on the network identified by the interpreter.

Summarizing, an improved single workstation has been disclosed for managing and controlling multiple communication networks using different protocols and coupled to the workstation through a common bus. A programmable digital filter collects and counts traffic conditions and problems on each respective network using real time identification of protocols encapsulating or embedded in frames transmitted on the common bus. The filter stores addresses, frame data, and statistics derived from the network and control information in respective files in a storage means. An interpreter analyzes the stored data for each versus network models and generates commands for corrective conditions in such networks. The interpreter also displays traffic conditions in the networks on a graphical user interface. A microprocessor implements the commands for changing the networks to overcome traffic problems and conditions as well as load balancing among the networks. The real time monitoring and control of multiple communication networks using different protocols by means of a passive monitor in combination with storage means, interpreter and processor will enhance the performance and utilization of a single workstation in managing and controlling multiple networks using different protocols.

While the specific embodiment of the invention has been disclosed, it will be understood by those having skill in the art that changes can be made to the embodiment without departing from the spirit and scope of the invention.

What is claimed is:

1. A workstation for monitoring and controlling multiple communication networks using different protocols comprising:

a common bus coupling the workstation to a plurality of network adapters, the bus including data, address and control lines;

each adapter connected to a different network using a protocol;

a programmable digital filter coupled across the bus for collecting data, address and control information indicative of traffic events occurring on the common bus for each network, the filter identifying the protocols on the bus to count traffic events for each network;

means for receiving and storing in files information indicative of traffic events occurring on the address, data, and control lines for the networks;

an interpreter accessing the stored files for analyzing the performance of each network and generating (i) a graphical display of conditions existing in the networks and (ii) commands for correcting traffic problems and/or balancing communication loading among the networks as identified from the traffic events occurring in the networks; and a processor for implementing the commands in the networks to overcome such traffic conditions and balance communication loading among the networks.

2. The workstation of claim 1 further including a graphical user interface for displaying traffic conditions occurring in the networks.

3. The workstation of claim 2 wherein data frames are transmitted on the networks, each frame including a routing indicator for identifying whether the frame is within a network or between networks.

4. The workstation of claim 3 wherein the routing indicator identifies the location of an information field in the frame relative to a frame header.

5. The workstation of claim 4 wherein the information is stored in the files by data, address and control lines.

6. The workstation of claim 5 further including direct memory access (DMA) for enabling the filter to capture DMA activity between an adapter and the workstation to optimize traffic flow in the networks.

7. The workstation of claim 6 wherein the filter detects and reports a failed adapter to the interpreter for switching the network to a hot standby adapter to replace the failed adapter.

8. The workstation of claim 7 wherein the stored files include a table of addresses of active networks for network intrusion determination by the interpreter based upon address information detected by the filter.

9. The workstation of claim 8 further including multiprocessors and wherein the filter detects processor cycle times and input/output activity as an input to the interpreter for optimizing the workload served by the processors.

10. In a workstation coupled to a plurality of networks through a common bus including address, data and control lines, a method of monitoring and controlling multiple communication networks using data frames and different protocols, comprising the steps of:

a) identifying and counting network addresses on the address line using a programmable digital filter;

b) storing the network addresses in a storage means;

c) identifying and counting network fault and security violations in the networks using the filter;

d) storing the fault and security violation information in the storage means;

e) examining data flames on each network for protocol information using the digital filter;

f) storing the protocol information in the storage means;

g) examining the stored information in the storage means relative to network models for traffic problems on the networks:using an interpreter;

h) generating commands for correcting traffic problems identified as occurring on the networks; and i) implementing the commands in the networks to correct traffic problems occurring in the networks using a processor.

* * * * *